United States Patent [19]
Brinkrolf

[11] Patent Number: 6,033,044
[45] Date of Patent: Mar. 7, 2000

[54] WHEEL ASSEMBLY FOR A SELF-PROPELLED IMPLEMENT

[75] Inventor: Wilhelm Brinkrolf, Harsewinkel, Germany

[73] Assignee: Caterpillar Inc., Peoria, Ill.

[21] Appl. No.: 08/992,353

[22] Filed: Dec. 17, 1997

[30] Foreign Application Priority Data

Jan. 17, 1997 [DE] Germany ............................ 197 01 436

[51] Int. Cl.⁷ .................................................. B62D 55/12
[52] U.S. Cl. ........................ 305/194; 305/195; 305/199
[58] Field of Search ................................... 305/136, 184, 305/193, 194, 195, 199

[56] References Cited

U.S. PATENT DOCUMENTS

| 2,704,942 | 3/1955 | Koile ................................. 305/195 X |
| 2,984,524 | 5/1961 | Franzen ................................. 305/194 |
| 3,606,497 | 9/1971 | Gilles ..................................... 305/194 |
| 5,433,515 | 7/1995 | Purcell et al. ...................... 305/193 X |

FOREIGN PATENT DOCUMENTS 55-114670  9/1980  Japan ..................................... 305/193

*Primary Examiner*—Russell D. Stormer
*Attorney, Agent, or Firm*—Striker, Striker & Stenby; Larry G. Cain

[57] ABSTRACT

A self-propelled implement, preferably a combine or chopper, with a track belt drive shall be designed in such a way, that the wear of the track belts is reduced during shifting caused by cornering. The drive wheels and the idler pulleys of the track belt drive are equipped on both sides of the guide elements of the track belts with freely pivoting rollers, whose turning axes are perpendicular to the axles of the track drive. They are set into motion during contact with the guide elements, thus eliminating friction.

7 Claims, 2 Drawing Sheets

Fig_1_
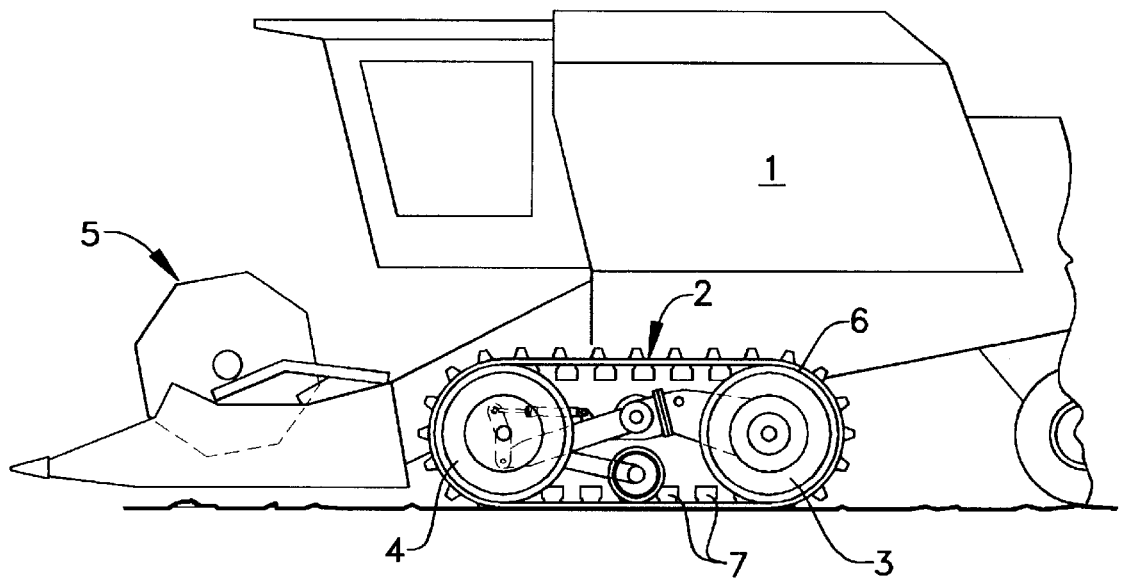
Fig_2_
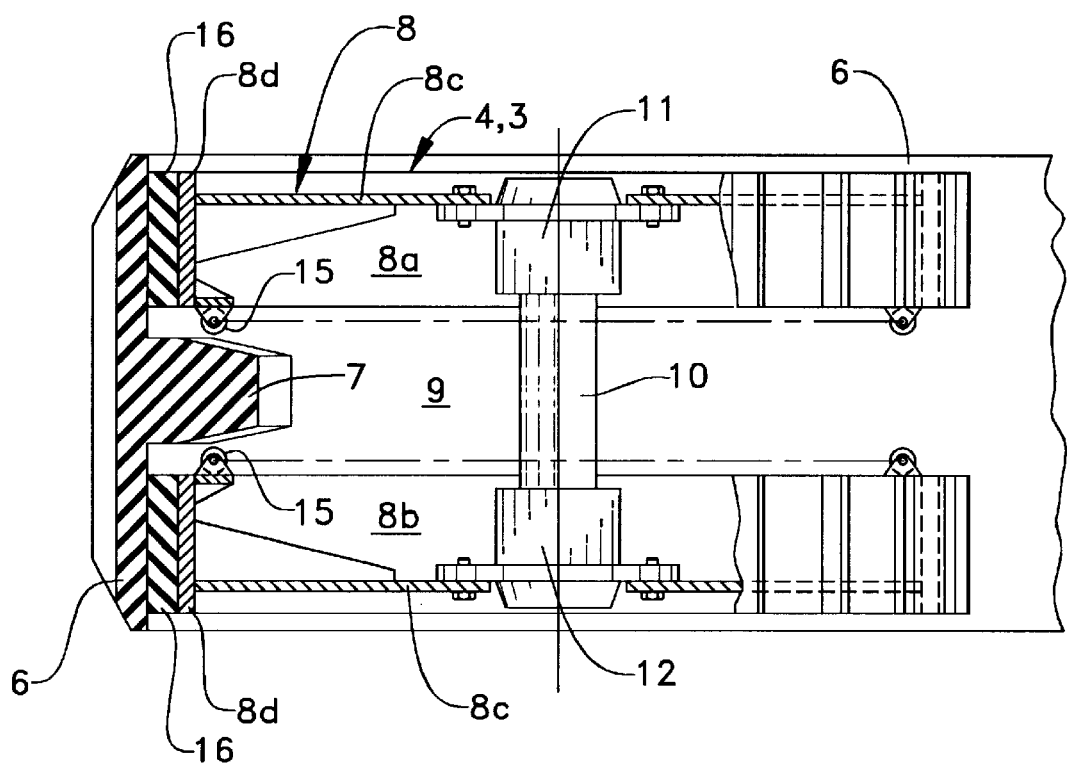

WHEEL ASSEMBLY FOR A SELF-PROPELLED IMPLEMENT

BACKGROUND OF THE INVENTION

The invention concerns a self-propelled implement, specifically an agricultural implement, such as a combine, chopper or tractor or similar, that is equipped with pretensioned, endless track belts, made of a flexible material, which are provided on their inside with guide elements, and controlled via drive wheels and idler pulleys, located on the axles, in that the guide elements engage into clearances of the drive wheels and idler pulleys.

With the here mentioned self-propelled implements, the axles for the drive wheels and idler pulleys are located parallel and in a spaced relation to each other. Normally, the track belt drive is part of the drive train, since a self-propelled implement is further equipped with a steerable axle, onto which bogie wheels are arranged. The steerable axle in agricultural implements is located in the rear. The track belt drives of the suitable self-propelled implements are known in different designs. In general, the rear axle of the track belt drive is propelled. Each drive wheel and each idler pulley consist, in most cases, of two halves, so as to provide the center clearance for the guide elements of the track belt. The guide elements can be designed either by inside grousers or guide bars arranged in line. In order that the side flanks of the guide elements do not contact the facing surfaces of the drive wheels or idler pulleys, respectively, the width of the respective clearance is greater than the width of the guide element. It becomes unavoidable during cornering, that the track belts shift on the drive wheels and idler pulleys. This shifting occurs also during operation of the self-propelled implement on a slope. The side flanks of the guide elements make then contact with the facing surfaces of drive wheels and idler pulleys, so that the wear on the guide bars is relatively high.

The purpose of the invention has the fundamental task to further develop a self-propelled implement of the above described kind in a simple manner, in that the wear on guide elements of the track belts, caused by the unavoidable shifting of the track belts during cornering, and/or on a slope, is significantly reduced, and the life of the track belts is accordingly increased.

The invention solves this problem by providing the drive wheels and idler pulleys, on both sides of the guide elements of the track belts with free pivoting as well as synchronously rotating contact bodies, whose rotating axes are perpendicular and at equal distances to the axles of the track drive.

The shifting of the track belt perpendicular to the moving direction causes now the respective side flanks of the guide elements to impact the contact bodies, which thus are rotated. The direction of rotation is also perpendicular to the moving direction of the track belt. The rotation of the contact bodies eliminates the previously unavoidable friction, which caused high wear. Friction between the drive wheels and/or idler pulleys, made of metal, must be prevented, since the track belts do not resist it, as they are made of rubber or a rubber-like synthetic material.

A constructive, simple solution is achieved, in so far as the contact bodies are designed as rollers with a cylindrical or preferably spherical casing surface. A relatively large surface is covered when the guide elements engage with the rollers, thus, the resulting increased surface pressure remains within acceptable limits. The spherical casing surface results already in a rotation of the respective roller, when the side flanks of the guide elements only slightly run against it. The distances between the contact bodies and/or the rollers, must be kept to a minimum, especially when the guide elements of the track belts are designed as guide bars arranged in line. It should then be avoided that the rollers are crowded into the clearance spaces. It is therefore provided with such a design, that the clearance space between two consecutive contact bodies or rollers, respectively, is less than the depth of a guide bar extending along the moving direction of the track belts. Each guide bar could then support itself on a contact body, or the areas, which are present forward and rearward in the moving direction would support themselves on two consecutive contact bodies. The contact bodies and rollers, respectively, can be pivoted in a constructively simple manner, in that they have front end bosses, which engage in bores of bearing blocks, which, in turn, are preferably bolted to a mounting disc, located at the wheel or idler pulley body. The contact bodies together with the bearing blocks form a collar, synchronously rotating with the wheel or the idler pulley. Since the bearing blocks, for example, detachable through bolts, are connected with the mounting disc, the assembly and, if necessary, the disassembly of the contact bodies is easily performed. A simple construction of the wheels and idler pulleys, nevertheless highly stable under load, is achieved, in that the mounting disc which carries the bearing blocks, is fastened to a thrust ring, concentric to the wheel axle or idler pulley axle, and that the thrust ring is rigidly connected with a wheel hub mounted by means of a flange disc mounted on the wheel axle or idler pulley axle. The mounting disc is then located rectangular and welded to the thrust ring. The mounting disc and the flange disc are connect especially advantageous with the thrust ring. The flange disc is in an especially effective manner connected with the wheel hub and is detachable from the same. The clearances required for the guide elements are designed in the simplest manner, in that each drive wheel and each idler pulley consists of two wheel halves or two pulleys halves, respectively, between which the guide elements of the track belts proceed. In order to decrease slippage between the track belts and the retainer rings it is proposed, that each thrust ring has a friction coating on the side facing the track belt. The friction coating consists of a material with a high friction coefficient.

Based on the attached drawings, the invention is explained in detail.

BRIEF DESCRIPTION OF DRAWINGS

FIG. 1 is a partial view of a self-propelled implement, according to the invention, designed as a combine.

FIG. 2 is a drive wheel or an idler pulley, respectively, of the track drive in cross section.

DESCRIPTION OF THE PREFERRED EMBODIMENT

Figure 3:
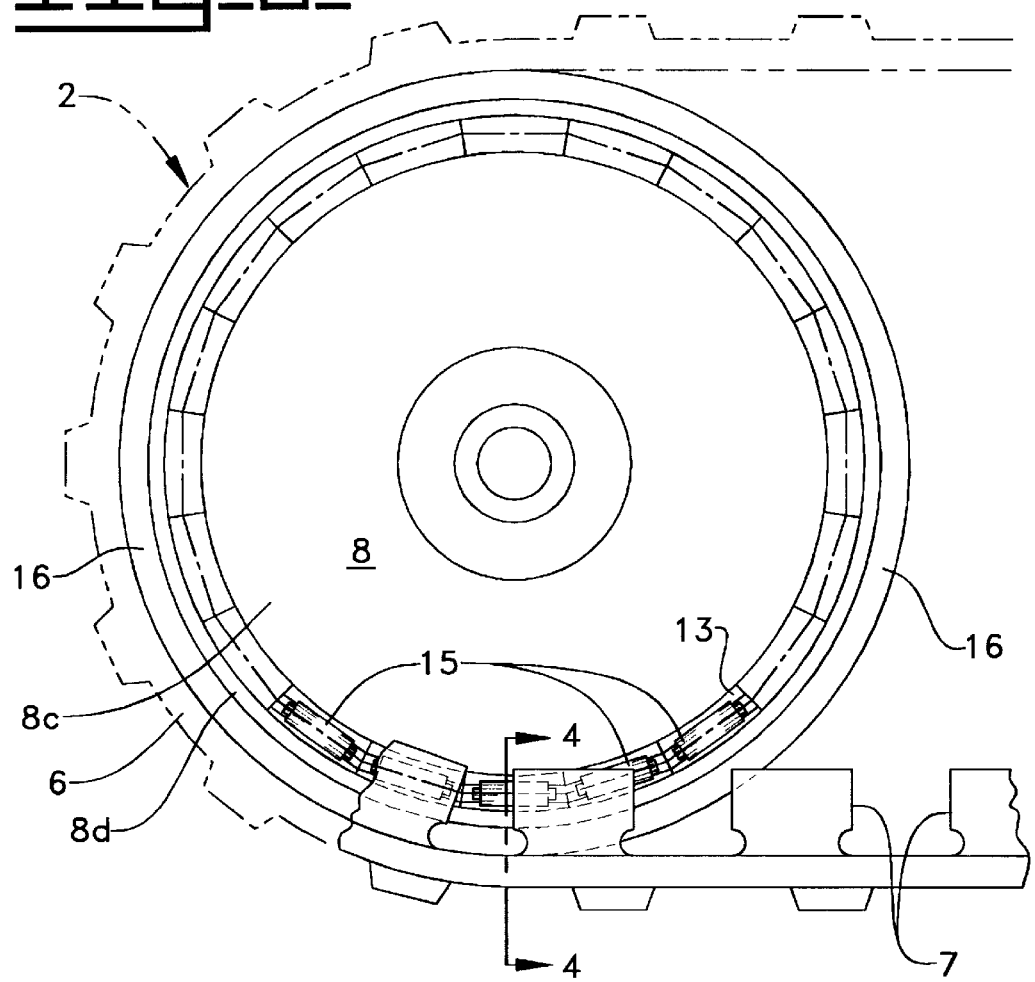
FIG. 3 is in detail the arrangement of the contact bodies in a front view.
Figure 4:
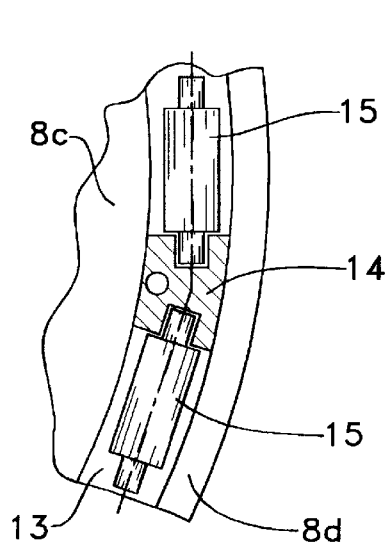
FIG. 4 is the mounting of the contact bodies designed as rollers in a detail.
Figure 5:
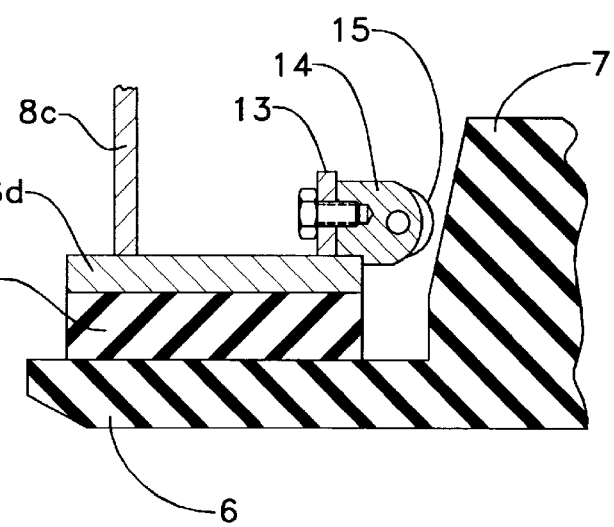
FIG. 5 is the attachment of the contact bodies on the wheel body as a detail in a sectional illustration along the line V-V in FIG. 3.

The combine 1 is equipped with a track drive 2, which has two drive wheels 3, and two aligned idler pulleys 4, on each side. The drive wheels 3 are driven by the internal combustion engine of the combine 1, herein not further illustrated, via an appropriate drive train. The drive wheels 3 are located in the rear of the combine 1, in relation to its forward driving direction, so that the idler pulleys 4 are located in front, i.e., facing an harvester mechanism 5. An endless track belt 6 constructed of flexible material, such as rubber, is guided over each lateral drive wheel 3, and the associated idler pulley 4. On the inside of track belt 6, and equidistant to the side edges, a guide element is mounted, which can be designed as a continuous guide grousers or according to FIG. 3, a plurality of guide bars 7 are arranged in line. In the depicted design example, each wheel body 8, and idler pulley body, respectively, consists of two body halves 8a, 8b. A clearance 9 is provided between both body halves 8a, 8b, into which the guide bars 7 or guide elements extend. The lateral drive wheels 3, and the idler pulleys 4, are mounted in a detachable fashion to wheel hubs 11, 12, which are assembled on an axle 10. Each body halve 8a, 8b, consist basically of a flange disc 8c, mounted in a detachable fashion on the associated wheel hub 11, 12, respectively, onto which a thrust ring 8d, is circumferential mounted, which is concentric to the axles 10. On the outside of thrust ring 8d, as shown in FIG. 5, a mounting disc 13, is welded on the side facing the guide bars 7. Therefore, this mounting disc 13 is in spaced relationship to flange disc 8c. A number of bearing blocks 14 are bolted to the mounting disc 13 in an angular distance to each other, which are located on the side facing toward the guide bars 7. These bearing blocks 14 are provided on the face with cylindrical pocket hole bores. Front side bearing bosses of rollers 15, which are pivoted freely, engage into this pocket hole bore, and provide contact bodies for the guide bars 7 during a shifting of the track 6. As apparent from the illustrations, the rotating axis of the rollers 15 is perpendicular to the axles 10 of the track belt drive 2. Furthermore, each mounting disc 13 is set into simultaneous rotation with the drive wheels 3 and the idler pulleys 4. It results from FIGS. 2 and 5, that the rollers 15 are set into motion as soon as the guide bars 7 move against them during shifting of the track belt 6. Hence, a friction causing increased wear is avoided. FIG. 3 shows, that the number of rollers 15 may be in the range of approximately twenty pieces. Accordingly, the angular distances between the rollers are correspondingly small. Furthermore, FIG. 3 and 4 indicate that the distances between two rollers 15 are less than the lengths of these rollers 15. Moreover, these distances are less than the depth of the guide bars 7, which extend in the moving direction of track belts 6, so that, according to the illustration based on FIG. 3, the areas of the guide bars 7, located to the front and rear in the moving direction, can also fit up against two rollers 15. This prevents any of the guide bars 7 from getting into the clearances between the rollers 15. FIG. 4 shown as an alternative, that the rollers 15 can be designed cylindrically or with a spherical casing surface. In addition, FIG. 3 shows, that the joined rotating axes of the rollers 15, describe a regular square. Contrary to the depicted designs, the rollers 15, could also be mounted on pins, rigidly placed into bearing blocks 14. It is essential that they rotate easily, so that they are set into motion during run-on of the guide bars 7. In order to increase friction between the body halves 8a and 8b, of the driven lateral wheels 3, outer friction rings 16 are rigidly mounted onto thrust rings 8d.

What is claimed is:

1. In a self-propelled implement, being adapted for use with a track belt drive, having a pair of pretensioned, endless track belts made of a flexible material, which are provided on their inside with a plurality of guide elements, and being controlled via a pair of drive wheels and a pair of idler pulleys, located on the axles, in that the guide elements extend into clearances of the drive wheels and idler pulleys, the improvement comprising:

the drive wheels are equipped with a plurality of contact bodies pivotally mounted on the drive wheels and positionable on both sides of the guide elements of the track belts for simultaneous rotation with the drive wheels and idler pulleys, said contacting bodies defining rotating axes; and perpendicular and equidistant to axles of the track belt drive.

2. The self-propelled implement, according to claim 1, wherein the contact bodies are designed as rollers having a length being greater than the diameter and having one of a cylindrical and spherical configuration.

3. The self-propelled implement, according to claim 1, wherein the guide elements are guide bars, spaced from one another and which extend along the moving direction of track belts in line with one another, wherein the distances between two consecutive contact bodies are less than the spacing between the guide bars.

4. The self-propelled implement, according to claim 2, wherein a plurality of bearing blocks are mounted to a mounting disc defined on one of the drive wheel or idler pulley, the bearing blocks defining a plurality of bores on opposing end faces thereof and being positioned between the contact bodies and adapted receive a boss defined on opposing ends of the contact bodies within the bores defined in the end faces.

5. The self-propelled implement, according to claim 4, wherein the mounting disc is fastened to a thrust ring and is positioned concentricly with respect to a hub defined by one of the wheel axle and the idler pulley axle, the thrust ring being rigidly connected to the hub by means of a flange disc.

6. The self-propelled implement, according to claim 1, wherein each drive wheel and each idler pulley consists of two body halves or pulley halves, which are spaced from one another a distance sufficient to receive the guide elements of the track belts.

7. The self-propelled implement, according to claim 6, wherein a thrust ring is mounted on each of the body halves and has a friction reducing layer positioned on a side thereof that faces the track belt.

* * * * *

UNITED STATES PATENT AND TRADEMARK OFFICE
CERTIFICATE OF CORRECTION

PATENT NO. : 6,033,044
DATED : March 7, 2000
INVENTOR(S) : Wilhelm Brinkholf

It is certified that error appears in the above-indentified patent and that said Letters Patent is hereby corrected as shown below:

In the claims:

Column 4, line 20, insert --said axes being-- before "perpendicular"

Signed and Sealed this

Thirteenth Day of March, 2001

*Attest:*

NICHOLAS P. GODICI

*Attesting Officer*   Acting Director of the United States Patent and Trademark Office